March 27, 1962 G. HENDRY ETAL 3,026,972
ENERGY ABSORBING SEAT BELT ATTACHMENT
Filed April 13, 1959

INVENTORS
GEORGE HENDRY
HARRY A. MELLINGER
BY
Walter J. Jason
ATTORNEY

United States Patent Office 3,026,972
Patented Mar. 27, 1962

3,026,972
ENERGY ABSORBING SEAT BELT ATTACHMENT
George Hendry and Harry A. Mellinger, San Diego, Calif., assignors to General Dynamics Corporation, San Diego, Calif., a corporation of Delaware
Filed Apr. 13, 1959, Ser. No. 806,108
3 Claims. (Cl. 188—1)

The present invention relates to an energy absorbing apparatus, and more particularly relates to an energy absorbing apparatus which is connected between an aircraft passenger seat and the passenger seat belt.

Ordinarily, a seat belt is attached directly to the aircraft seat with no energy absorbing device connected between the two items. Unfortunately, this usual arrangement is the cause of many fatal injuries, rather than the safety device which it is intended to be. When an aircraft experiences a crash the impact is generally in a forward direction, so that passengers are thrown forward against their seat belts. This force on the seat belts is transmitted directly to the passenger seat structure, with the result being separation of the aircraft seat from the aircraft floor. When this happens, the passenger and seat hurtle through the aircraft as though from a catapult.

One way to prevent this kind of occurrence would be to provide the aircraft with a much stronger floor frame and much stronger passenger seats, with the seats secured to the floor frame in a superior fashion. To do this however, would be to impose a prohibitive weight increase on the aircraft, making its operation either impractical or uneconomical. The present invention however, provides a much simpler and more readily acceptable solution to this serious problem.

An object of the present invention is to provide a means for reducing the magnitude and number of injuries in aircraft accidents.

Another object of the present invention is to provide an energy absorbing apparatus between aircraft passenger seats and their associated passenger seat belts.

Another object is to provide a simple, light-weight, and efficient energy absorbing apparatus which, when connected between an aircraft passenger seat and passenger seat belt, will cause a passenger to experience less deceleration than the aircraft itself during a crash.

Another object is to provide a simple and economical energy absorbing apparatus connected between an aircraft passenger seat and a passenger seat belt to considerably reduce forces imposed on the aircraft seat structure during an aircraft crash.

Other objects and features of the present invention will be readily apparent to those skilled in the art from the following specification and appended drawing wherein is illustrated a preferred form of the invention, and in which.

Figure 1:
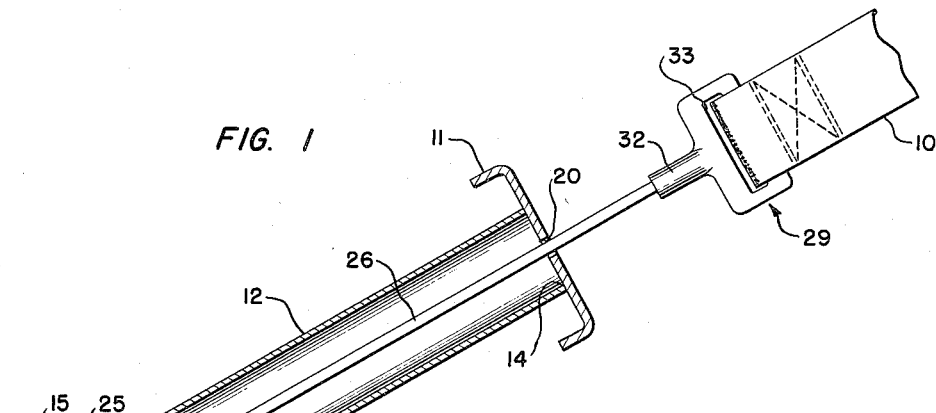
FIGURE 1 is a plan view showing a portion of a seat belt and aircraft seat structure with the energy absorbing apparatus, in cross-section, connected therebetween.
Figure 2:
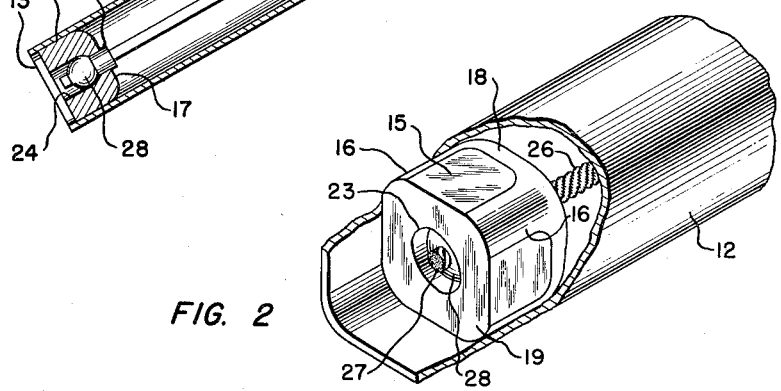
FIGURE 2 is a perspective view of a part of the energy absorbing apparatus with a portion thereof broken away for clarity.
Figure 3:
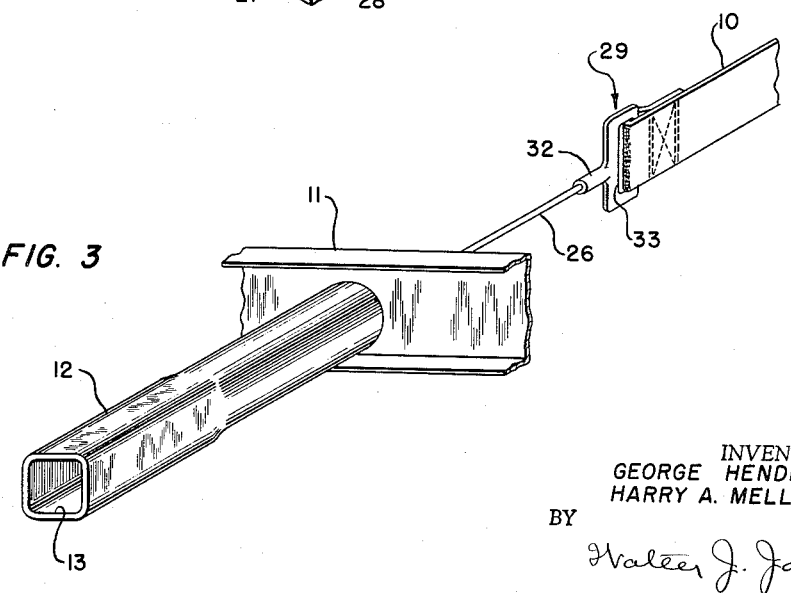
FIGURE 3 is a perspective view illustrating the operation of the energy absorbing apparatus.

Referring now to the drawing, a seat belt 10, of nylon webbing or the like, is shown connected to a portion 11 of an aircraft seat by an energy absorbing apparatus. The energy absorbing apparatus is comprised of a cylindrical metal tube 12 having a first open end 13 and a second end 14. End 14 of tube 12 is disposed against seat structure 11 so that it is a substantially closed end portion, save for a small hole 20 in seat structure 11.

As shown in FIGURE 1, a mandrel 15 is disposed inside tube 12 adjacent open end 13. The mandrel has a substantially square cross-section so that its being urged into round tube 12 causes the tube to deform and acquire a similar shape. The mandrel is positioned far enough within the tube so that the tube portion adjacent open end 13 is permanently deformed and cannot pop the mandrel out of the tube by any spring action of the tube end.

The substantially square mandrel does not have 90° corners however, but instead has corners 16 which have a particular radius of curvature, as will be more fully discussed later on. The front face 17 of the mandrel also has contoured or curved edges 18 while the rear face 19 of the mandrel is flat. A counterbored hole 23 is positioned through the center of mandrel 15 and has a large hole portion 24 and a small hole portion 25. A cable 26, which does not have to be pre-loaded or pre-stretched, is disposed through counterbored hole 23 and has an end portion 27 on which a ball-type fitting 28 is swaged. The ball portion of fitting 28 fits within portion 24 of counterbored hole 23 but is too large to be pulled through smaller portion 25 of counterbored hole 23. Thus, end 27 of cable 26 is caught or held by the mandrel so that forces on cable 26 will be transmitted thereto.

From mandrel 15 the cable 26 extends through the length of tube 12, through hole 20 in seat structure 11, and then on to seat belt 10. Cable 26 is connected to the seat belt by a T-shaped fitting 29 which has a portion 32 swaged onto cable 26 and a slot 33 which accommodates a loop of the seat belt.

It is understood that other suitable fastening means could be used to connect the cable to the seat belt and mandrel, if so desired. Then too, the tube 12 need not be connected to the seat structure as shown, but may be fastened to the seat in any other suitable manner. If this is done though, then tube 12 should still be provided with a substantially closed end 14, which closure can be effected in a variety of fashions. Still other permissible structural deviations or equivalents may become obvious from the following description of the operation of the present invention.

While an aircraft is taking off, or during normal or emergency landing approaches, the passengers in the aircraft have their seat belts fastened. Should the aircraft unfortunately crash, the passengers are generally thrown forward against their seat belts. Considerable force is then transmitted through the seat belt and attached cable to mandrel 15. Mandrel 15 is then pulled through cylindrical tube 12, distorting the tube as it progresses therethrough into a tube having a substantially square cross-section. Depending on the force transmitted to the mandrel, it may or may not reach the closed end 14 of tube 12. Generally, however, the forces that will be experienced by the mandrel will not be sufficient to move it the entire length of the tube.

A considerable amount of energy is required to distort tube 12, so that the kinetic energy acquired by a passenger upon impact is greatly reduced through its being converted into mechanical disfiguration of tube 12. The passenger thus does not experience substantially the same impact deceleration as that experienced by the aircraft and aircraft seats, as he would were the seat belt connected directly to the seat structure.

In addition to this however, the forces imposed on the aircraft seat are considerably less than those that would be experienced were it connected directly to the seat belt. The seat thus remains secured to the aircraft cabin floor under much more severe impact conditions.

The present invention consequently causes the passenger to be subjected to less physical punishment and greatly increases his chances of survival. It is obvious that passenger deceleration and forces imposed on the seats can be controlled or varied by changing the amount of energy required to deform cylindrical tube 12. This can be done by changing the thickness of the tube or the material from which it is manufactured. In addition, the radius of curvature on corner edges 16 of the mandrel can be varied to make the mandrel easier or more difficult to move through tube 12. The greater the radius of curvature, the more cylindrical mandrel 15 will become, and the less the energy that will be absorbed by movement thereof. It is understood that the mandrel and tube cross-sections need not be square and round respectively, but may have any shapes which, relative to one another, cause deformation of the tube.

Another, but different type, of advantage inherent in the present invention is its extreme simplicity. The reliability of the apparatus is enhanced by the uncomplicated yet unique approach taken in the overall design of the apparatus. Further, its light weight and low cost are factors that make it ideally suited for use in the aircraft industry, where weight and economy are given wide consideration.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. An energy absorbing apparatus comprising an elongated hollow member of substantially uniform interior cross-section having first and second end portions and having walls radially bendable but longitudinally rigid, a mandrel forcibly disposed within said first end portion of said hollow member for travel longitudinally of said member in the direction of said second end portion, said mandrel being of a substantially uniform cross-section dissimilar from said interior cross-section of said hollow member so as to forcibly engage said hollow member, when disposed therein, only at spaced apart portions thereby to exert radial forces upon the hollow member to bendably distort same and draw portions of said radially bendable wall intermediate said spaced apart portions toward contiguity with corresponding adjacent portions of said mandrel, and linking means operably connected with said mandrel to transmit forces thereto to urge said mandrel through said hollow member toward the said second end portion thereof, thereby progressively effecting said hollow member distortion and absorbing such force as is required to effect said distortion.

2. An energy absorbing apparatus comprising an elongated tubular member of substantially uniform and circular interior cross-section having first and second end portions and having walls radially bendable but longitudinally rigid, a mandrel forcibly disposed within said first end portion of said tubular member for travel longitudinally of said member in the direction of said second end portion, said mandrel being of a substantially uniform multi-sided cross-section and thus dissimilar from said circular interior cross-section of said tubular member so as to forcibly engage said tubular member, when disposed therein, only at spaced apart portions of the tubular member thereby to exert radial forces upon the tubular member to bendably distort same and draw portions of its radially bendable wall disposed intermediate said spaced apart portions toward contiguity with corresponding adjacent portions of said mandrel, and linking means operably connected with said mandrel to transmit forces thereto to urge said mandrel through said tubular member toward the said second end portion thereof, thereby progressively effecting said tubular member distortion and absorbing such force as is required to effect said distortion.

3. An energy absorbing apparatus comprising an elongated tubular member of substantially uniform and circular interior cross-section having first and second end portions and having walls radially bendable but longitudinally rigid, a mandrel forcibly disposed within said first end portion of said tubular member for travel longitudinally of said member in the direction of said second end portion, said mandrel having a front face and a rear face and having a major portion of substantially uniform cross-section, said major portion being characterized by flat side faces intersecting one another in rounded side corners, said mandrel front face intersecting the said mandrel side faces in rounded front corners, said mandrel forcibly engaging said tubular member when disposed therein only at said rounded side and front corners thereby to exert radial forces at spaced apart portions of the tubular member to bendably distort same and draw portions of said radially bendable wall intermediate said spaced apart portions toward contiguity with corresponding adjacent portions of said mandrel, and linking means operably connected with said mandrel to transmit forces thereto to urge said mandrel through said tubular member toward the said second end portion thereof, thereby progressively effecting said tubular member distortion and absorbing such force as is required to effect said distortion.

References Cited in the file of this patent

UNITED STATES PATENTS

| | | |
|---|---|---|
| 2,401,748 | Dillon | June 11, 1946 |
| 2,578,903 | Smith | Dec. 18, 1951 |
| 2,639,913 | Reynolds | May 26, 1953 |
| 2,682,931 | Young | July 6, 1954 |
| 2,857,056 | Dilworth | Oct. 21, 1958 |
| 2,870,871 | Stevinson | Jan. 27, 1959 |